3,655,804
ALKYNE CONVERSION
Filippo Pennella, Bartlesville, Okla., assignor to
Phillips Petroleum Company
No Drawing. Filed Aug. 12, 1968, Ser. No. 751,756
Int. Cl. C07c *11/28, 5/26*
U.S. Cl. 260—678                15 Claims

ABSTRACT OF THE DISCLOSURE

One or more alkynes are converted to other alkynes by contact with a catalyst active for the disproportionation of propylene to ethylene and butene.

---

The invention relates to the conversion of substituted and unsubstituted alkynes to produce alkyne products different from the converted alkyne. In one aspect, the invention relates to the conversion of alnynes in the presence of a catalyst which is active for the disproportionation of propylene into ethylene and butene. In another aspect, the invention relates to the conversion of an alkyne by the alkyne reaction process as defined herein.

Processes have previously been discovered which are capable of converting olefinically unsaturated compounds into other olefinic compounds by a reaction called the "olefin reaction." Such processes are carried out with a catalyst active for disproportionating propylene into ethylene and butene. It has now been discovered that alkynes can be converted to other alkynes in a manner which is analogous to the conversion of olefins.

An object of this invention is to convert alkynes into alkynes different from the converted alkyne. Another object of the invention is to convert acyclic alkynes into acyclic alkynes differing therefrom. Other aspects, objects and the advantages of this invention will be apparent to one skilled in the art in the written description and the claims.

According to the present invention, alkynes, including alkyne hydrocarbons and substituted alkynes, are converted into other alkyne products differing from the converted material, by contacting the alkyne, either alone or in combination with other alkynes, over a catalyst which is active for the disproportionation of propylene to ethylene and butene.

The term "alkyne reaction," as used herein, is defined as a process for the catalytic conversion of a feed comprising one or more acetylenically unsaturated compounds to produce a resulting product which contains at least ten percent by weight of product compounds, which product compounds can be visualized as resulting from at least one primary reaction, as defined below, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components are not included in the resulting product for the purpose of determining the above-noted percentages.

In the alkyne reaction, as defined above, one primary reaction is a reaction which can be visualized as comprising the breaking of two existing acetylenic unsaturated bonds between first and second carbon atoms and between third and fourth carbon atoms, respectively, and the formation of two new acetylenic unsaturated bonds between said first and third and between said second and fourth carbon atoms. Said first and second carbon atoms and said third and fourth carbon atoms can be in the same or different molecules. Another primary reaction is the production of cyclic trimers of an alkyne.

The alkyne reaction according to this invention is illustrated by the following reactions:

(1) The disproportionation of an acyclic mono- or polyyne having at least three carbon atoms into other acyclic mono- or polyynes of both higher and lower number of carbon atoms; for example, the disproportionation of 2-pentyne yields 2-butyne and 3-hexyne; the disproportionation of 1,5-hexadiyne yields acetylene and 1,5,9-dicatriyne;

(2) The conversion of an acyclic mono- or polyyne having three or more carbon atoms and a different acyclic mono- or polyyne having three or more carbon atoms to produce different acyclic alkynes; for example, the conversion of 2-pentyne and 2-hexyne yields 2-butyne and 3-heptyne;

(3) The conversion of acetylene and an internal acyclic mono- or polyyne having four or more carbon atoms to produce other alkynes having a lower number of carbon atoms than that of the acyclic mono- or polyyne; for example, the conversion of acetylene and 3-hexyne yields 1-butyne;

(4) The conversion of acetylene or an acyclic mono- or polyyne having three or more carbon atoms and a cyclic mono- or cyclic polyyne to produce an acyclic polyyne having a higher number of carbon atoms than that of any of the starting materials; for example, the conversion of cyclooctyne and 2-butyne yields 2,10-dodecadiyne;

(5) The conversion of one or more cyclic mono- or cyclic polyynes to produce a cyclic polyyne having a higher number of carbon atoms than any of the starting materials; for example, the conversion of cyclopentyne yields 1,6-cyclodecadiyne and continued reaction can give higher molecular weight material;

(6) The conversion of an acyclic polyyne having at least 7 carbon atoms and having at least 5 carbon atoms between any two triple bonds to produce acyclic and cyclic mono- and polyynes having a lower number of carbon atoms than that of the feed; for example, the conversion of 1,7-octadiyne yields cyclohexyne and acetylene; or (7) The conversion of one or more acyclic polyynes having at least 3 carbon atoms between any two triple bonds to produce acyclic and cyclic mono- and polyynes generally having both a higher and lower number of carbon atoms than that of the feed material; for example, the conversion of 1,4-pentadiyne yields 1,4-cyclohexadiyne and acetylene.

Compounds suitable for conversion according to the present invention include cyclic, acyclic, branched and unbranched alkynes containing from 1 to about 5, preferably one, triple bond per molecule, and mixtures thereof, including mixtures with acetylene. The alkynes can be unsubstituted or can contain substituents which either because of their nature or their distance from the triple bond, do not unduly interfere with the reaction including, for example, such hydrocarbon substituents as cycloalkyl and aryl groups, and other substituents including polar substituents such as halo or cyano groups. The alkynes can also contain olefinic unsaturation.

A preferred group for conversion according to the present invention is alkynes containing from 3 to about 20 carbon atoms per molecule, but higher molecular weight materials, even polymeric materials, which contain acetylenic unsaturation can be converted. Excellent results are obtained with acyclic alkynes.

Some examples of alkynes suitable for use in the present invention are acetylene, propyne, butyne-1, butyne-2, pentyne-1, pentyne-2, 3-methylbutyne-1, hexyne-2, 4,4-dimethylpentyne-1, heptyne-1, 1,5-hexadiyne, dodecyne-1, cyclopentadecyne, cycloheptadecyne, 5-phenylpentyne-2, 3-cyclopentahexyne-1, eicosyne-3, and the like, and mixtures thereof. Compounds containing both double and triple bonds in the molecule can be utilized including, for example, 1-hexen-5-yne, 1,5-hexadien-3-yne, and others.

The process according to this invention can be carried out either in the presence or absence of a diluent. However, the use of a diluent can increase the selectivity of the conversion to disproportionation products. Diluents comprising paraffinic and cycloparaffinic hydrocarbons can be employed. Suitable diluents include, for example, propane, cyclohexane, methylcyclohexane, normal pentane, normal hexane, isooctane, dodecane, and the like, or mixtures thereof, including primarily those paraffins and cycloparaffins having up to about 12 carbon atoms per molecule. The diluent should be non-reactive under the conditions of the alkyne reaction.

Olefins can also be present in the reaction mixture. For the most part, an olefinic linkage, whether in the alkyne reactant or in another compound present in the reaction mixture, will not enter in the alkyne reaction or into an analogous reaction with another olefinic linkage.

The catalysts which are useful in the present invention are those which have activity for the disproportionation of propylene into ethylene and butenes at relatively high temperatures. Preferred catalysts are solid disproportionation catalysts. Some examples of such catalysts are:

(1) silica or thoria promoted by a sulfide or tungsten molybdenum or by an oxide or compound convertible to an oxide by calcination of tungsten, molybdenum, rhenium, vanadium, niobium, thorium or tantalum;

(2) alumina promoted by an oxide or compound convertible to an oxide by calcination of molybdenum, tungsten or rhenium; a sulfide of tungsten or molybdenum; or an alkali metal salt, ammonium salt, alkaline earth metal salt, or bismuth salt of phosphomolybdic acid;

(3) one or more of the group zirconia, aluminum phosphate, zirconium phosphate, calcium phosphate, magnesium phosphate, or titanium phosphate promoted by one or more of a sulfide of molybdenum or tungsten, or an oxide or compound convertible to an oxide by calcination of molybdenum, tungsten, vanadium, niobium, tantalum or rhenium, or magnesium tungstate or beryllium phosphotungstate; and (4) silica, alumina, zirconia, thoria, aluminum phosphate, zirconium phosphate, calcium phosphate, magnesium phosphate, or titanium phosphate promoted by a hexacarbonyl of molybdenum or tungsten.

Catalysts particularly suitable for carrying out the process of the invention are those which show activity for disproportionating propylene at relatively high temperatures, i.e., at temperatures above about 400° F. This preferred group of catalysts includes oxides of tungsten, molybdenum, rhenium, vanadium, niobium, or tantalum, associated with silica, zirconia, or the phosphates of alumina, zirconium, calcium, magnesium, and titanium. Of these, the most preferred catalyst is a composition comprising a major portion of silica which has been promoted with a minor portion of tungsten oxide.

The catalysts of (1) can be prepared and activated by conventional techniques such as by combining a catalyst grade silica with suitable tungsten, molybdenum, rhenium, vanadium, niobium, thorium, or tantalum compounds by a conventional method such as for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activated by heating in an inert atmosphere.

The catalyst of (2) can be prepared and activated by conventional techniques such as by combining catalyst grade alumina with an oxide or a compound convertible with an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air to produce an activated catalyst. Alternately, the support material, such as zirconia, can be impregnated with a compound of the promoter convertible to the oxide, such as ammonium tungstate, followed by calcination in air. In the preparation of a sulfide-containing catalyst, a sulfide of the promoter can be ball milled with a support, such as zirconium phosphate, followed by heating in an inert atmosphere such as nitrogen. Magnesium tungstate and beryllium phosphotungstate can be dry mixed with titanium phosphate, for example, and activated by calcination in air at elevated temperatures.

The catalyst compositions of (4) can be prepared and activated by impregnating a previously calcined support material, such as calcium phosphate, with a solution of the hexacarbonyl of the promoter in an organic solvent such as benzene, followed by drying in a vacuum or in an inert amtosphere at about 50 to 700° F.

The catalytic agent is considered to be the reaction product resulting from the admixture of the support material and the promoter material which is subjected to activation treatment.

The operating temperature for the process of this invention when using catalysts of (1) is in the range of about 400 to 1100° F.; when using catalysts of (2) is in the range of from about 150 to 500° F.; when using catalysts of (3) is in the range of about 600 to 1200° F.; when using catalysts of (4) is in the range of about 0 to 600° F. Generally the pressure is not critical except with respect to the state of the materials in the reaction zone and conditions up and down stream from the reaction zone but generally the pressure will be in the range of 0 to 2000 p.s.i.g.

Other catalysts include those disclosed in Ser. No. 412,343, filed Nov. 19, 1964, now U.S. Pat. No. 3,395,196, and Ser. No. 421,692, filed Dec. 28, 1964, now U.S. Pat. No. 3,418,390.

With a fixed bed reactor and continuous operation, weight hourly space velocity (WHSV) in the range of 0.5 to 1000 parts by weight of hydrocarbon feed by part by weight of catalyst per hour are suitable, with excellent results having been obtained in the range of 1 to 200.

The following specific embodiments of the invention will be helpful in attaining an understanding of the invention but they are of course exemplary and should not be considered unduly limiting.

EXAMPLE I

A fixed bed reactor was charged with 1 part by volume of a $WO_3/SiO_2$ catalyst (containing about 7 weight percent $WO_3$) and the catalyst was activated in flowing air at 600° C. for 1 hour, flushed with nitrogen, treated with flowing $CO_2$ for 30 minutes at 600° C., flushed with nitrogen again, and cooled to 300° C.

A stream comprising 99 weight percent pentyne-2 was passed through activated MgO at room temperature for purification. There were indications that some oxygenated material was removed. Cyclohexane was then added and the final mixture passed into the reactor at a rate of 12 parts by volume liquid pentyne-2/hr., at 300–320° C., and at atmospheric pressure. The mixture of the stream entering the reactor was determined by chromatography and found to be:

| Component: | Weight percent |
|---|---|
| Pentyne-2 | 98.1 |
| Cyclohexane | 1.5 |
| Unknown | 0.4 |

After 30 minutes the reactor effluent was sampled and analyzed.

The results of the analysis showed that the total conversion of pentyne-2 was about 25 percent. The selectivity to butyne-2 and hexyne-3 was about 20 percent for an overall conversion of pentyne-2 to butyne-2 and hexyne-3 of about 5 percent. Further analysis on a silicone chromatographic column showed that in addition to the materials having a carbon number $\leq 6$, the products contained one major component and two minor components in the $C_{15}$ range. These results indicate that trimerization of the pentyne-2 occurred. No reaction of the pentyne-2 was observed when the same feed was passed over $SiO_2$ at 350° C.

EXAMPLE II

In the same manner as described in Example I, a mixture of 7 parts by volume pentyne-2 and 8 parts by volume cyclohexane was passed through a 1 part by volume bed of the $WO_3/SiO_2$ catalyst in a fixed bed reactor over a 30-minute period. The catalyst bed had previously been activated by heating in flowing air at 600° C. for 1 hour followed by flushing with nitrogen and cooling to the reaction temperature for the run which was about 350° C. The run was carried out at atmospheric pressure.

Analysis of the effluent showed the following in weight percent:

| Component | Effluent | Feed |
|---|---|---|
| Butyne-2 | 4.31 | |
| Pentyne-2 | 28.9 | 51.8 |
| Cyclohexane | 47.5 | 47.5 |
| Hexyne-3 | 7.65 | |
| Other heavies | 10.78 | |
| Unknown | 0.86 | 0.8 |

Thus the conversion of pentyne-2 was 44 percent and the selectivity to disproportionation products was 53 percent. These data show that the presence of an inert diluent increases the selectivity of the conversion to disproportionation products.

That which is claimed is:

1. A process for converting an alkylene which comprises contacting a feed stream containing at least one alkyne selected from cyclic, acyclic, branched and unbranched alkyne hydrocarbons containing 1 to 5 triple bonds and having at least 3 carbon atoms per molecule, mixtures thereof and mixtures of at least one such alkyne hydrocarbon and acetylene with a catalyst selected from the group consisting of
    (1) silica or thoria promoted by a sulfide of tungsten or molybdenum or by an oxide [or compound convertible to an oxide by calcination] of tungsten, molybdenum, rhenium or thorium;
    (2) alumina promoted by an oxide of molybdenum, tungsten or rhenium; a sulfide of tungsten or molybdenum; or an alkali metal salt, ammonium salt, alkaline earth metal salt, or bismuth salt of phosphomolybdic acid;
    (3) one or more of the group aluminum phosphate, zirconium phosphate, calcium phosphate, magnesium phosphate, or titanium phosphate promoted by one or more of a sulfide of molybdenum or tungsten, or an oxide [or compound convertible to an oxide by calcination] of molybdenum, tungsten or rhenium, or magnesium tungstate or beryllium phosphotungstate; and
    (4) silica, alumina, thoria, aluminum phosphate, zirconium phosphate, calcium phosphate, magnesium phosphate, or titanium phosphate promoted by a hexacarbonyl of molybdenum or tungsten;
        under conditions, including conditions of temperature, pressure and contact time suitable for producing products of the alkyne reaction which, as defined herein, can be visualized as comprising the reaction between two first pairs of carbon atoms, the two carbon atoms of each first pair being connected by an acetylenic unsaturated bond, to form two new pairs from the carbon atoms of said first pairs, the two carbon atoms of each of said new pairs being connected by an acetylenic unsaturated bond; and
        said temperature being a temperature at which the selected catalyst is active for producing said products of the alkyne reaction, said temperature being within the range of 0 to 1200° F.

2. The process of claim 1 wherein said alkyne is unsubstituted and said catalyst comprises a silica-containing base wherein the amount of any alumina in said base is less than a preponderant amount and at least one oxide selected from the group consisting of molybdenum oxide and tungsten oxide and said temperature is in the range of 400 to 1100° F.

3. The process of claim 1 wherein said alkyne is unsubstituted and said catalyst consists essentially of alumina and between 0.5 and 30 weight percent of at least one oxide selected from the group consisting of molybdenum oxide and tungsten oxide and said temperture is in the range of 150 to 500° F.

4. The process of claim 1 wherein said feed comprises at least one unsubstituted acyclic alkyne having three to twenty carbon atoms per molecule.

5. The process of claim 2 wherein said feed comprises at least one acyclic alkyne having three to twenty carbon atoms per molecule.

6. The process of claim 3 wherein said feed comprises at least one acyclic alkyne having three to twenty carbon atoms per molecule.

7. The process of claim 4 wherein said feed is substantially free of acetylene.

8. The process of claim 5 wherein said feed is substantially free of acetylene.

9. The process of claim 6 wherein said feed is substantially free of acetylene.

10. The process of claim 4 wherein said acyclic alkyne having three to twenty carbon atoms per molecule is an internal alkyne.

11. The process of claim 1 wherein said alkyne hydrocarbon has 3 to about 20 carbon atoms per molecule.

12. The process of claim 11 wherein said catalyst is selected from the group consisting of silica or thoria promoted by a sulfide of tungsten or molybdenum or by an oxide of tungsten, molybdenum, rhenium or thorium.

13. The process of claim 11 wherein said catalyst is selected from the group consisting of alumina promoted by an oxide of molybdenum, tungsten or rhenium; a sulfide of tungsten or molybdenum; or an alkali metal salt, ammonium salt, alkaline earth metal salt, or bismuth salt of phosphomolybdic acid.

14. The process of claim 11 wherein said catalyst is selected from one or more compounds of the group consisting of aluminum phosphate, zirconium phosphate, calcium phosphate, magnesium phosphate, or titanium phosphate promoted by one or more of a sulfide of molybdenum or tungsten, or an oxide of molybdenum, tungsten or rhenium, or magnesium tungstate or beryllium phosphotungstate.

15. The process of claim 11 wherein said catalyst is selected from the group consisting of silica, alumina, thoria, aluminum phosphate, zirconium phosphate, calcium phosphate, magnesium phosphate, or titanium phosphate promoted by a hexacarbonyl of molybdenum or tungsten.

References Cited

UNITED STATES PATENTS

| | | | |
|---|---|---|---|
| 2,990,434 | 6/1961 | Smith | 260—673 |
| 2,798,890 | 7/1957 | Waterman et al. | 260—673 |
| 3,057,839 | 10/1962 | Zeiss | 260—94.1 |
| 3,066,119 | 11/1962 | Meriwether | 260—88.2 |
| 2,846,490 | 8/1958 | Witt | 260—673 |
| 3,395,196 | 7/1968 | Heckelberg | 260—683 |
| 3,261,879 | 7/1966 | Banks | 260—683 |
| 3,471,586 | 10/1969 | Lester et al. | 260—683 |

FOREIGN PATENTS

| | | | |
|---|---|---|---|
| 1,159,056 | 7/1969 | Great Britain | 260—683 |

DELBERT E. GANTZ, Primary Examiner

J. M. NELSON, Assistant Examiner

U.S. Cl. X.R.

260—666, 673

UNITED STATES PATENT OFFICE
CERTIFICATE OF CORRECTION

Patent No. 3,655,804      Dated April 11, 1972

Inventor(s) Filippo Pennella

It is certified that error appears in the above-identified patent and that said Letters Patent are hereby corrected as shown below:

Column 5, lines 60-61, delete "[or compound convertible to an oxide by calcination]";

Column 5, lines 72-73, delete "[or compound convertible to an oxide by calcination]";

Signed and sealed this 24th day of October 1972.

(SEAL)
Attest:

EDWARD M. FLETCHER, JR.
Attesting Officer

ROBERT GOTTSCHALK
Commissioner of Patents